(12) United States Patent
Ishii et al.

(10) Patent No.: US 7,628,242 B2
(45) Date of Patent: Dec. 8, 2009

(54) VEHICLE LIMITED SLIP DIFFERENTIAL

(75) Inventors: Takanori Ishii, Okazaki (JP); Yuichi Ushiroda, Okazaki (JP); Takao Tsuchiya, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/051,595

(22) Filed: Mar. 19, 2008

(65) Prior Publication Data

US 2008/0245596 A1 Oct. 9, 2008

(30) Foreign Application Priority Data

Apr. 6, 2007 (JP) .......................... P2007-100714

(51) Int. Cl.
*B60K 17/348* (2006.01)
(52) U.S. Cl. ..................................... 180/248
(58) Field of Classification Search .............. 180/248, 180/249, 250
See application file for complete search history.

(56) References Cited

U.S. PATENT DOCUMENTS 5,094,125 A * 3/1992 Bota ........................ 477/102

FOREIGN PATENT DOCUMENTS

| EP | 1508466 A1 | 2/2005 |
|---|---|---|
| JP | 2004314796 A | 11/2004 |
| JP | 2005-162097 A | 6/2005 |
| JP | 2007303508 A | 11/2007 |

\* cited by examiner

*Primary Examiner*—Kevin Hurley
(74) *Attorney, Agent, or Firm*—Birch, Stewart, Kolasch & Birch, LLP

(57) ABSTRACT

A limited slip differential for a vehicle includes an engine, a transmission, a differential mechanism operable to distribute an output from the engine which is transmitted by way of the transmission to one of a pair of left and right front wheels and a pair of left and right rear wheels, a transfer mechanism which is disposed closer to a center of the vehicle in the left-right direction than the differential mechanism, and a distribution controller operable to control amounts of distributed outputs. The differential mechanism is disposed in a first side of the transfer mechanism. The distribution controller is disposed in a second side of the transfer mechanism which is opposite to the first side, and includes a clutch mechanism operable to limit a differential action between the one of the drive shafts and the output shaft.

2 Claims, 2 Drawing Sheets

VEHICLE LIMITED SLIP DIFFERENTIAL

BACKGROUND

1. Field of the Invention

The present invention relates to a limited slip differential for a four-wheel drive vehicle.

2. Description of the Related Art

In recent years, electronically controlled on-demand type four-wheel drive vehicles based on FF (front engine, front-wheel drive) vehicles have widely been put into practical use. As is described in Japanese Patent Publication No. 2005-162097A, an electronically controlled on-demand type four-wheel drive vehicle is configured such that power of an engine is delivered to front wheels via a transmission, and part of the power is electronically controlled to be outputted to rear wheels via a transfer clutch and hence has superior performances with respect to driving stability and suppression of slips. In addition, the characteristics of the four-wheel drive vehicle can be increased further by providing in a differential thereof a locking mechanism or a distribution controller for limiting a differential action between its two output shafts to prevent wheel spin.

In the case of the electronically controlled on-demand type four-wheel drive vehicle based on the FF vehicle, however, a cylinder block of the engine, a power steering mechanism for steering drive wheels, a front cross member which is provided in the front of the vehicle as a body, an exhaust pipe and the like are mounted in a front part of the vehicle, and a transmission and a transfer case are assembled onto the vehicle by making use of spaces eventually left between them. Consequently, although a distribution controller for the front wheels is attempted to be incorporated in the transmission or the transfer case, enlargement of a housing of the transmission or the transfer case due to the incorporation of the distribution controller immediately results in interference of the housing with the cylinder block or the other various components accommodated in the front part of the vehicle, whereby easy equipment of a suitable distribution controller has been prevented.

In the event that a mechanical slip limiting mechanism such as a viscous coupling for limiting the differential action is used for the distribution controller, although the resulting distribution controller becomes compact in size and hence the equipment of such a distribution controller is facilitated, the manner of limiting the differential action becomes simple, and it becomes difficult to satisfy demands with respect to the performance of the vehicle on various running conditions. In the event that the differential action limiting characteristics are made more active, although the traction performance can be increased, the difference in rotational speed between the two output shafts or wheels cannot be accommodated sufficiently in the differential, and hence, a braking phenomenon or the like is generated when the vehicle corners, and on the other hand, in the event that the differential action limiting characteristics are made less active, sufficient countermeasure may not be able to be obtained in case there is caused a difference in rotational speed between the two wheels.

To cope with this, although, for example, a mechanism made up of a multi-plate clutch including an electromagnetic coil is preferable as the distribution controller in that the differential action limiting characteristics can be set arbitrarily, the mechanism of such a unit becomes complex, and in association with this, a large installation space becomes necessary, thus a limited slip differential unit equipped with such a distribution controller having been unable to be easily used on the FF-based four-wheel drive vehicles which have little extra space in the interior of the engine compartment.

SUMMARY OF THE INVENTION

According to one aspect of the invention, there is provided a limited slip differential for a vehicle including: an engine and a transmission which are arranged in a left-right direction of the vehicle, the transmission comprising an output shaft; a differential mechanism, operable to distribute an output from the engine which is transmitted by way of the transmission to one of a pair of left and right front wheels and a pair of left and right rear wheels, as distributed outputs; a transfer mechanism, which is disposed closer to a center of the vehicle in the left-right direction than the differential mechanism, and operable to transmit the output of the transmission to the other one of the pair of left and right front wheels and the pair of left and right rear wheels; and a distribution controller operable to control amounts of distributed outputs, wherein: the differential mechanism includes: a differential case, coupled with the output shaft of the transmission to be rotated; a differential gear mechanism, accommodated within the differential case and operable to generate the distributed outputs; and a pair of drive shafts, each of which is connected to the differential gear mechanism and extends in the left-right direction; the transfer mechanism includes: output shaft connected to the differential case and provided coaxially with one of the drive shafts; and a propeller shaft connected to the output shaft and extending in a front-rear direction of the vehicle; the differential mechanism is disposed in a first side of the transfer mechanism; the distribution controller is disposed in a second side of the transfer mechanism which is opposite to the first side; and the distribution controller comprises a clutch mechanism operable to limit a differential action between the one of the drive shafts and the output shaft.

BRIEF DESCRIPTION OF THE DRAWINGS

Embodiment may be described in detail with reference to the accompanying drawings, in which.

DETAILED DESCRIPTION OF THE INVENTION

Figure 1:
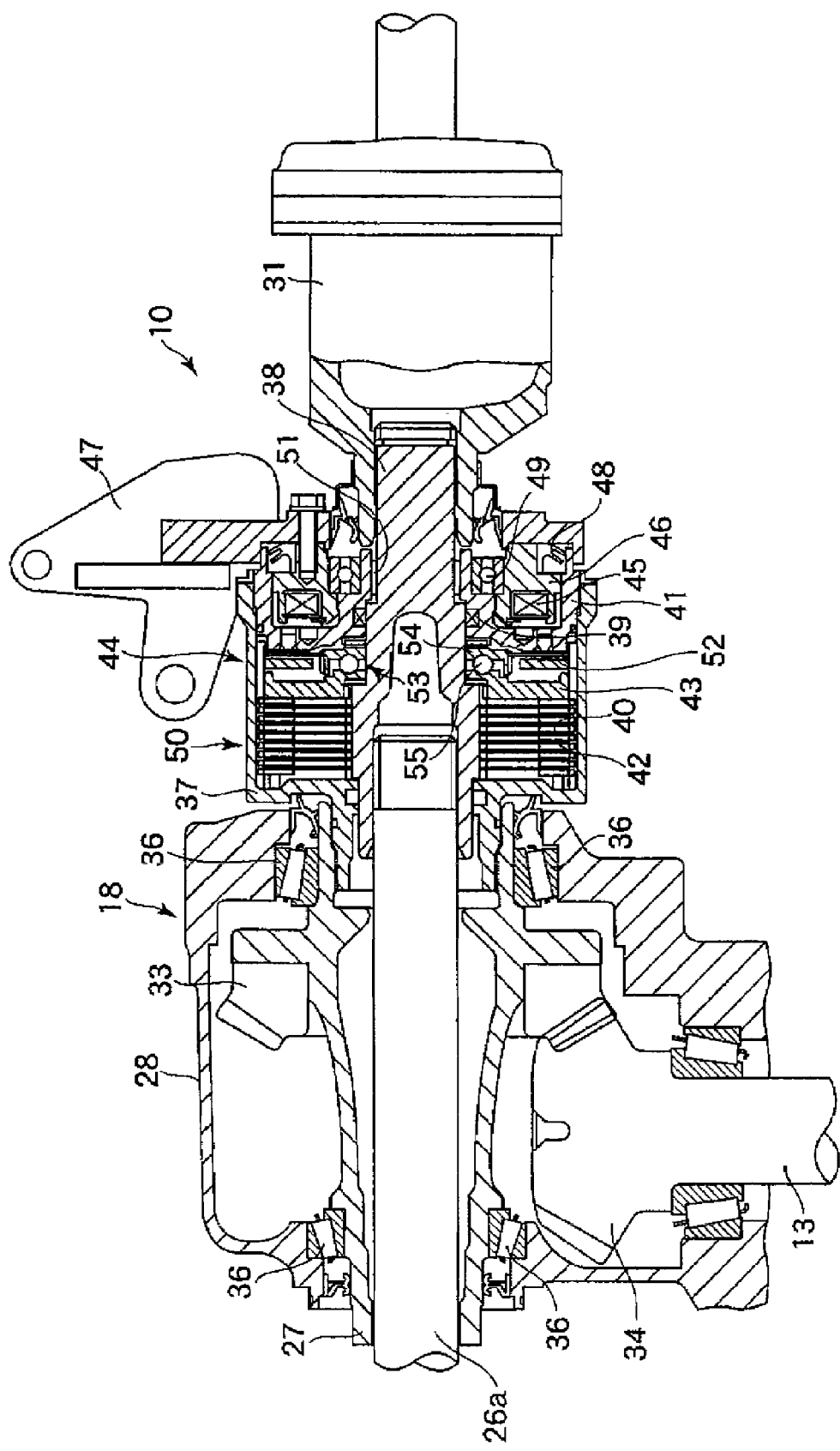
FIG. 1 is a partial sectional view showing an embodiment of a limited slip differential according to the invention.

An embodiment of a limited slip differential according to the invention will be described by reference to the drawings. FIG. 1 shows a distribution controller 10 for front wheels. As is shown in FIG. 2, the distribution controller 10 is equipped in a front part of a vehicle A.

The vehicle A is an electronically controlled on-demand type four-wheel drive vehicle which is built based on an FF (front-engine, front-wheel drive) vehicle, in which an engine 11 is mounted transversely in the front part so as to drive front wheels 12, and power of the engine 11 that is to be delivered to rear wheels 15 is adjusted by controlling an electronically controlled coupling 14 which is provided on a propeller shaft 13, whereby the on-demand type four-wheel vehicle is provided.

Figure 2:
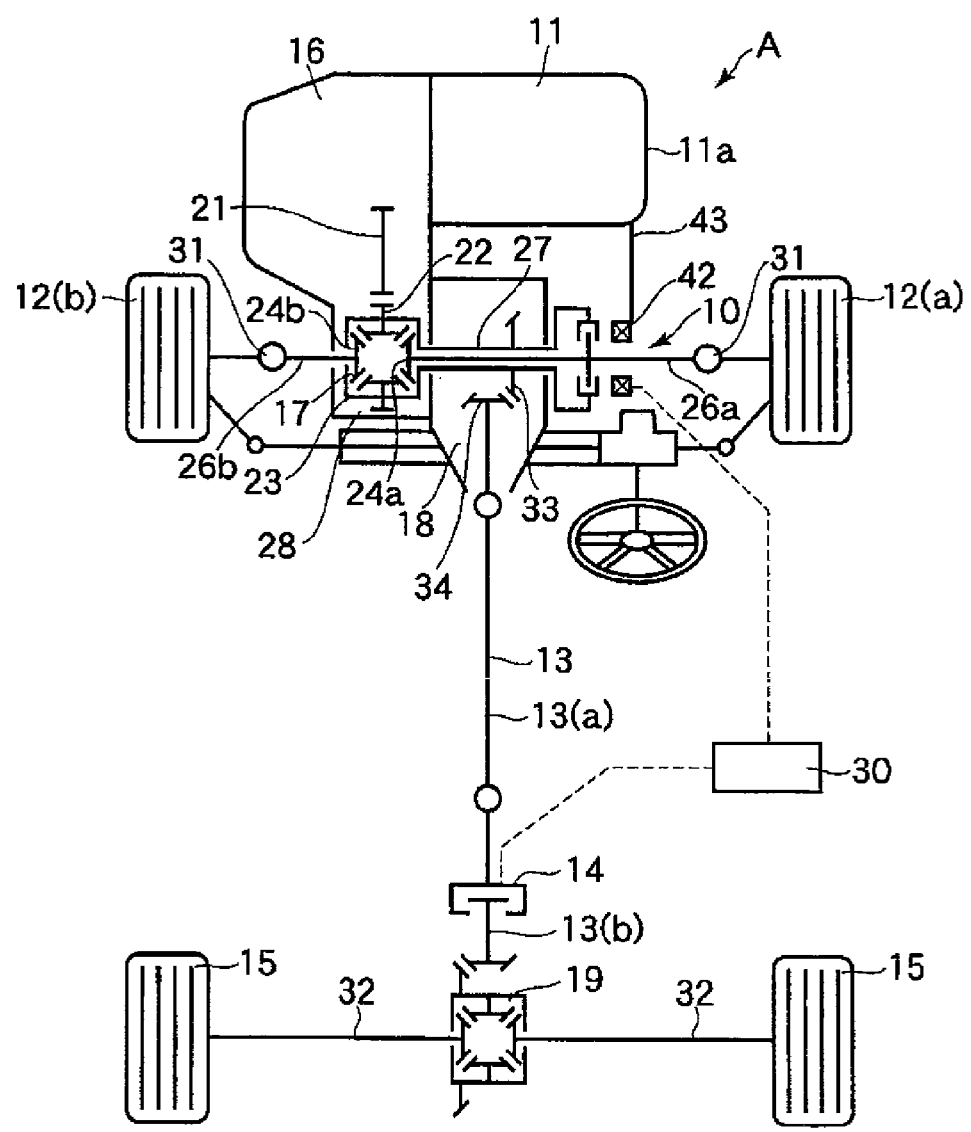
FIG. 2 is an exemplary view showing the configuration of a vehicle.

To be specifically, as is shown in FIG. 2, the vehicle A includes a transmission 16 which is provided at the left of the engine 11, a front differential unit 17 which is connected to the transmission 16 as a left/right wheel differential unit, a transfer case 18 which is provided to a side of the front differential unit 17 and the propeller shaft 13 which extends from the transfer mechanism 18 as a front/rear axle propeller shaft and a rear differential unit 19.

The transmission 16 is coupled to an output shaft (not shown) of the engine 11, and an output gear 21 of the transmission 16 is made to mesh with a ring gear 22 or a differential case 23 of the front differential unit 17 (differential gear mechanism), whereby the differential case 23 is rotated by power of the engine 11. A right front wheel drive shaft 26a that is to be coupled to the right wheel. 12(a) is mounted on one side gear 24a of the front differential unit 17, and a left front wheel drive shaft 26b that is to be coupled to the left front wheel 12(b) is mounted on the other side gear 24b of the front differential unit 17, whereby power apportioned or distributed by the front differential unit 17 is transmitted to the left and right front wheels 12a, 12b via the front wheel drive shafts 26a, 26b, respectively.

In addition, a rear output member 27 is mounted on the differential case 23 of the front differential unit 17 as a member for diverting drive from the transmission 16 to output it to the other of front and rear axles. The rear output member 27 is formed into a cylindrical shape and is provided coaxially with the right front drive shaft 26a while extending into the transfer case 18. The transfer mechanism 18 has an outer shell which is commonly used as an outer shell of the front differential unit 17, and in the outer shell 28, a ring gear 33 mounted on the rear output member 27 is made to mesh with a pinion gear 34 mounted at an end portion of the propeller shaft 13, so as to transmit rotation of the rear output member 27 to the propeller shaft 13. A front/rear axle transmission unit (transfer mechanism) is made up of the rear output member 27, the ring gear 33, the pinion gear 34 and the like.

The propeller shaft 13 is made up of a front propeller shaft 13a and a rear propeller shaft 13b, and the rear propeller shaft 13b is connected to the rear differential unit 19. Left and right rear wheel drive shafts 32 are connected to the rear differential unit 19, whereby the drive from the engine 11 through the transmission 16 is delivered to the rear wheels 15 via the rear wheel drive shafts 32, respectively. In addition, the electronically controlled coupling 14 is provided between the front propeller shaft 13a and the rear propeller shaft 13b, and the electronically controlled coupling 14 is controlled by a controller (ECU) 30 to thereby be activated to operate as required, so as to adjust a rotational force that is transmitted between the front propeller shaft 13a and the rear propeller shaft 13b, whereby the delivery of power of the engine 11 to the rear wheels 15 can be adjusted arbitrarily relative to the delivery of the same to the front wheels 12.

In addition, the distribution controller 10 is provided to a side of the transfer mechanism 18. Next, the distribution controller 10 will be described in detail using FIG. 1.

FIG. 1 shows the transfer mechanism 18 and the distribution controller 10. The rear output member 27, which is connected to the front differential unit 17 (shown in FIG. 2), extends from the left of the figure and is rotatably supported on the outer shell 28 via a bearing 36. The rear output member 27 has a hollow construction, and the right front wheel drive shaft 26a is concentrically and rotatably disposed inside the hollow construction. A joint portion 31 is provided to the right of the right front wheel drive shaft 26a, and the right front wheel drive shaft 26a is coupled to the right front wheel 12a (shown in FIG. 2) via the joint potion 31 (shown in FIG. 2).

As has been described above, the rear output member 27 is made to mesh with the propeller shaft 13 via the ring gear 33 and the pinion gear 34 in an interior of the transfer mechanism 18. An inner circumferential surface of a right axial end of the rear output member 27 is keyed so as to fit on splines formed on an end portion of a clutch case 37 in a meshing fashion.

The clutch case 37 is formed into a cylindrical shape and includes a plurality of first clutch plates 40 in an interior thereof, and a end wall 41 is attached integrally to a right end of the clutch case 37. The end wall 41 is formed into a disc shape so as to close substantially the right end of the clutch case 37 and is rotatably assembled onto an outer circumferential surface of a clutch hub 38 via a seal material 39.

The clutch hub 38 is integrally fitted on the right front wheel drive shaft 26a by means of splines, and a plurality of second clutch plates 42 are mounted on an outer circumferential surface thereof which confronts the clutch case 37. The first clutch plates 40 and the second clutch plates 42 are provided alternately, so as to make up a multi-plate clutch 50. A pressure plate 43 is disposed at the right of the multi-plate clutch 50, and a pressing mechanism 44 (clutch mechanism) is provided between the pressure plate 43 and the end wall 41. (The clutch 50 and the pressing mechanism 44 are collectively referred to as a "distribution control device").

In addition, an electromagnetic coil 45 is provided in a left side of the end wall 41. The electromagnetic coil 45 is mounted on a disc-shaped mounting substrate 46 and is fixed to a cylinder block 11a of the engine via a stay 47 together with the mounting substrate 46. The electromagnetic coil 45 is connected to the control unit 30 (shown in FIG. 1). The electromagnetic coil 45 is activated as required by an activation signal from the control unit 30 or via a driver or the like.

The end wall 41 is rotatably mounted on the mounting substrate 46 via a bearing 49 in such a state that the end wall 41 is sealed with a seal material 48, and consequently, the electromagnetic coil 45 mounted on the mounting substrate 46 and the end wall 41 are made to rotate relative to each other in such a state that the electromagnetic coil 45 and the end wall 41 face each other. Furthermore, a bearing 51 is provided on an inner circumferential surface of the end wall 41, and the end wall 41 is rotatably mounted on the clutch hub 38 via the bearing 51.

The pressing mechanism 44 is provided to the side of the multi-plate clutch 50. The pressing mechanism 44 is made up of a pilot clutch 52 and a cam mechanism 53, and the pilot clutch 52 is made to face the electromagnetic coil 45 across the end wall 41 which is held therebetween. The cam mechanism 53 includes grooves formed on confronting surfaces of the pressure plate 53 and a disc 54 in such a manner that the depth of the grooves so formed gets shallower as they extend in a circumferential direction, and spherical elements 55 are provided in a space defined by the grooves.

The pressure plate 43 is made integral with the clutch hub 38, and the disc 54 is rotatable relative to the clutch hub 38 and is coupled to the pilot clutch 52. When the electromagnetic coil 45 is energized whereby the pilot clutch 54 is attracted towards the end wall 41, should there be then produced a difference in rotational speed between the rear output member 27 and the front wheel drive shaft 26, the disc 54 is dragged by the clutch case 37. Then, the grooves on the pressure plate 43 and the disc 54 are displaced from each other in the circumferential direction, and the spherical elements 55 are then held by the shallow portions of the grooves, whereby the pressure plate 43 and the disc 54 are separated apart from each other in the axial direction due to a wedging action produced by the shallow portions of the grooves. This presses the multi-plate clutch 55 in the axial direction so as to limit the difference in rotational speed produced between the rear output member 27 and the clutch hub 38, that is, the right front wheel drive shaft 26a.

The control unit 30 is connected to various types of sensors provided on the vehicle A which include a speed sensor, an accelerator pedal position sensor, a gear position sensor, wheel speed sensors (none of them shown) and the like and energizes the electronically controlled coupling 14 and the electromagnetic coil 45 based on detection values sent from the sensors The control unit 30 alters power transmission to the rear wheels by controlling the electronically controlled coupling 45 and reduces the difference in rotational speed produced between the left and right front wheels 12a, 12b by controlling the electromagnetic coil 45, so that the vehicle is prevented from slipping or obtains a stable posture control.

Thus, in the embodiment that has been described heretofore, the multi-plate clutch 50 is used as the distribution controller 10 of the front differential 17, and moreover, the multi-plate clutch 50 is provided transversely outwards of the outer shell 28 of the transfer mechanism 18 and the electromagnetic coil 45 is attached to the stay 47 fixed to the cylinder block 11a on the opposite side to the transfer mechanism 18 across the multi-plate clutch 50, whereby the limiting characteristics can be changed without expanding the outer shell 28 of the transfer mechanism 18 or the housing of the transmission 16, thereby making it possible to ensure the assembly of the distribution controller 10 which can cope with changing running conditions onto the front differential unit 17.

Note that while in the limited slip differential, the distribution controller 10 is made up of the multi-plate clutch 50, the electromagnetic coil 45, the pressing mechanism 44 and the like, the invention is not limited thereto, and hence, a distribution controller configured in a different way may be adopted. In addition, while in the embodiment, the four-wheel drive vehicle to which the invention is applied is built based on the FF (front-engine, front-wheel drive) vehicle, the invention is not limited to such a configuration, and hence, the invention can be applied to four-wheel drive vehicles which are built based on an FR (front-engine, rear-wheel drive) vehicle and an RR (rear-engine, rear-wheel drive) vehicle.

What is claimed is:

1. A vehicle limited slip differential, comprising:
   an engine;
   a transmission connected to the engine and arranged adjacent to the engine in a left-right direction of a vehicle;
   a left-right wheel differential device connected to an output element of the transmission and distributes output from the transmission to left and right wheels of one of front wheels and rear wheels of the vehicle;
   a transfer mechanism connected to the left-right differential device and arranged closer to a center of the vehicle with respect to the left-right direction than the left-right wheel differential device, and conveying the output of the transmission to another of the front wheels and the rear wheels; and
   a distribution control device connected to the transfer mechanism and controls distribution of the output conveyed to the one of the left and right wheels, wherein,
   the left-right wheel differential device includes:
      a differential case that receives a driving force from an output member of the transmission and rotates;
      a differential gear mechanism that distributes the driving force to the left and right wheels and accommodated in the differential case; and
      a left and right pair of drive shafts connected to the differential gear mechanism and extending in the left-right direction;
   the transfer mechanism includes:
      an output member that outputs driving force to another of the front wheels and the rear wheels and connected to the differential case and provided coaxially with one of the drive shafts; and
      a propeller shaft connected to the output member that outputs driving force to the another of the front wheels and rear wheels and extending in a front and rear direction of the vehicle;
   the distribution control device includes:
      a clutch mechanism disposed at a side of the engine opposite to the left-right wheel differential device with respect to the transfer mechanism and outside of a casing of the transfer mechanism, the clutch mechanism limiting rotation speed differential between the one of the drive shafts and the output member for the another of the front wheels and the rear wheels; and
   the clutch mechanism includes:
      a multi-plate clutch arranged between the output member for the other wheels and the one of the drive shafts and an electromagnetic coil that selectively engages and disengages the multi-plate clutch,
   the electromagnetic coil being fixed to a cylinder block of the engine via a stay, and the stay covering the electromagnetic coil from an outside in the left-right direction.

2. The vehicle limited slip differential according to claim 1, wherein
   the electromagnetic coil is arranged at another side of the transfer mechanism, sandwiching the multi-plate clutch therebetween.

* * * * *